H. C. VELIE.
HORSE HAY-RAKE.

No. 190,935. Patented May 15, 1877.

Witnesses.
Otto Hufeland
Robt E. Miller

Inventor.
Henry C. Velie
by
VanSantvoord & Hauff
his attorneys.

UNITED STATES PATENT OFFICE.

HENRY C. VELIE, OF POUGHKEEPSIE, NEW YORK.

IMPROVEMENT IN HORSE HAY-RAKES.

Specification forming part of Letters Patent No. 190,935, dated May 15, 1877; application filed August 22, 1876.

*To all whom it may concern:*

Be it known that I, HENRY C. VELIE, of Poughkeepsie, in the county of Dutchess and State of New York, have invented a new and useful Improvement in Horse-Rakes, which improvement is fully set forth in the following specification, reference being had to the accompanying drawing, in which—

Figure 1:
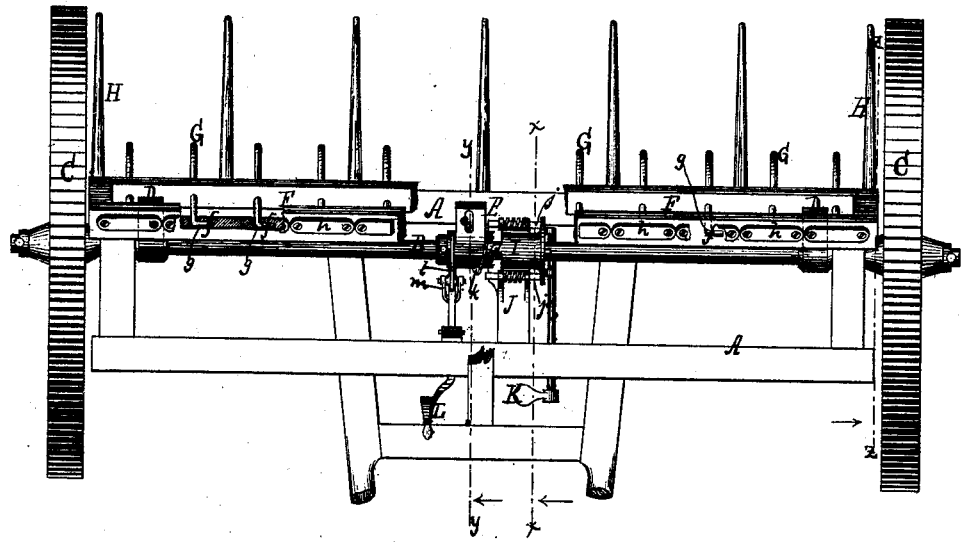
Figure 2:
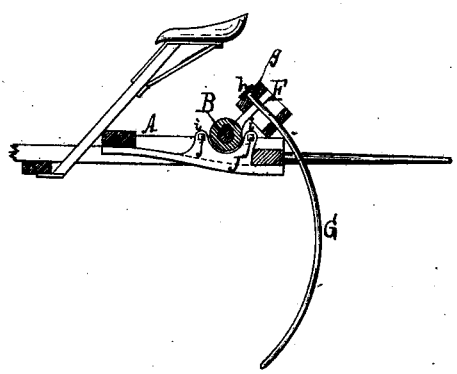
Figure 3:
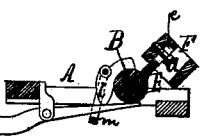
Figure 4:
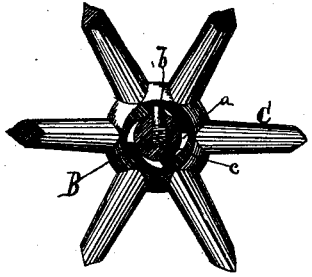

Figure 1 represents a plan or top view, partly in section. Fig. 2 is a transverse section in the plane $x\ x$, Fig. 1, and looking in the direction opposite to that line. Fig. 3 is a similar section in the plane $y\ y$, Fig. 1. Fig. 4 is a section of the wheel in the plane $z\ z$, Fig. 1.

Similar letters indicate corresponding parts.

This invention relates to certain improvements on that class of horse-rakes for which Letters Patent of the United States were granted to me October 5, 1875, and in which the rake-head is raised by the rotation of the axle of the vehicle by means of a clutch, which can be thrown in gear from the driver's seat.

My present improvement consists in combining, with the sliding portion or sleeve of the clutch, a dog which is moved when the sleeve is thrown in gear with the stationary portion or head of the clutch, and which is acted on by a cam secured to said clutch-head, so that, as soon as the material contained in the rake-teeth has been dumped, the clutch is disengaged automatically and the rake-teeth descend; also, in combining with the mechanism which serves to raise the rake by the rotation of the axle, and with the hand or foot lever, which serves to raise or depress the rake from the driver's seat, a stirrup which embraces said lever, but is not connected to the same, so that when the rake is raised by the rotation of the axle the hand or foot lever is not acted upon by the raising of the rake, and the driver is not endangered by sudden motions of said lever; also, in the combination, with the rake, the clutch-head, and the hand or foot lever, and the elevating-stirrup, of a toe, against which said lever can be brought to bear for holding the rake-teeth down on the ground; also, in the combination, with the clutch-head and clutch-sleeve, of a protecting-plate, which is fastened to the frame of the rake for preventing grass or other matter from passing between the two parts of the clutch, said protecting-plate being provided with standards, carrying the dogs which operate in conjunction with the clutch.

In the drawing, the letter A designates the frame of my horse-rake, which forms the bearings for the axle B, on the ends of which are mounted the wheels C. These wheels turn loosely on the axle, and in their hubs are formed ratchet-teeth $a$, which engage with dogs $b$, that fit loosely into sockets in the axle, and are exposed to springs $c$, which have a tendency to force the same outward in gear with the ratchet-teeth.

If one of the wheels is turned backward, its ratchet-teeth slide over the dog, and the axle remains stationary; but in turning the wheel forward the dog engages with the ratchet-teeth, and the axle is compelled to turn with the wheel. This mechanism is very simple. It produces very little additional cost, and it materially facilitates the operation of the rake.

On the axle B are mounted loosely three arms, D D E, which are secured to the rake-head F by means of screws $d$. These screws pass through slots $e$ in the arms, so that the rake-head can be moved in or out, and the distance of the rake-teeth from the ground can be adjusted. The rake-teeth G are provided with L-shaped heads $f$, which drop into recesses $g$ in the rake-head, and over these recesses is secured a strip, $h$, which serves to retain the rake-teeth in position. Said strip is made in sections, and if one of the rake-teeth breaks the corresponding section of the strip is taken off, and the tooth can be readily withdrawn and replaced by another. The recesses $g$ may be detached from each other, or made in the form of a continuous groove.

From the frame A extend guards H, between the rake and the wheels C, so that the grass or other matter acted on by the rake-teeth is prevented from catching between the spokes of the wheel.

The middle arm E forms the clutch-head, being provided with teeth on one end, which can be made to engage with the clutch-sleeve I, that is feathered on the axle B. Beneath the clutch is situated a guard-plate, J, which is fastened to the frame A, and serves to prevent grass or other impurities from catching between the two parts of the clutch.

From said guard-plate rise two lugs, $i$, which form the bearings for a dog, $j$, that is exposed to the action of a spring, which causes the same to bear against the clutch-sleeve and retain the same out of gear with the clutch-head. A foot-lever, K, serves to force the clutch-sleeve in gear with the clutch-head, and at the same time the dog $j$ is forced in against the action of its spring, and as the rake is raised by the revolution of the axle B a cam, $k$, on the clutch-head is caused to bear against the dog $j$, and to force the same, together with the clutch-sleeve, back to their original position, so that the rake descends immediately after its contents have been dumped. In practice I use two dogs, $j$, one on each side of the clutch, to insure a correct operation.

The foot-lever K is entirely detached from the clutch-sleeve, the backward motion of said sleeve being produced by the action of the dog $j$. From the clutch-head projects a toe, $l$, to which is pivoted a stirrup, $m$, which catches under a hand-lever, L, and retains the same up against the point of the toe $l$. By forcing the handle of this lever outward the rake is held down upon the ground; but if the rake is raised by the revolution of the axle B, the stirrup $m$ slides over said lever, and the danger that said lever, by an unforseen jerk, will injure the driver is avoided.

By these means a horse-rake is obtained which can be worked with great rapidity and ease, and which is not liable to get out of order.

What I claim as new, and desire to secure by Letters Patent, is—

1. The combination, with clutch-head E, rake-head F, axle B, and clutch-sleeve I, of a dog, $j$, and cam $k$, for controlling automatically the position of the clutch-sleeve, and causing the rake to drop immediately after its contents have been dumped, substantially as set forth.

2. The combination, with mechanism for automatically raising the rake from the ground, and with a lever which serves to depress the rake, of a stirrup, which embraces said lever and enables the same to raise the rake, substantially as described.

3. The combination, with the clutch-head E and rake-head F, provided with a toe, $l$, of the lever I and stirrup $m$, for raising the rake or keeping it upon the ground, substantially as described.

4. The combination, with the rake-head F, clutch-head E, and clutch-sleeve I, of the guard-plate J, provided with standards supporting the spring-dogs $j$, for the purpose of preventing the grass from catching between the clutch-teeth, and from interfering with the operation of the dogs, substantially as set forth.

In testimony that I claim the foregoing I have hereunto set my hand and seal this 7th day of August, 1876.

HENRY C. VELIE. [L. S.]

Witnesses:
 GEO. H. SHERMAN,
 F. W. DAVIS.